US011064356B2

(12) United States Patent
Shrestha et al.

(10) Patent No.: US 11,064,356 B2
(45) Date of Patent: *Jul. 13, 2021

(54) SECURITY FRAMEWORK FOR MSG3 AND MSG4 IN EARLY DATA TRANSMISSION

(71) Applicant: Apple Inc., Cupertino, CA (US)

(72) Inventors: Bharat Shrestha, Hillsboro, OR (US); Seau S. Lim, Swindon (GB); Yi Guo, Shanghai (CN)

(73) Assignee: Apple Inc., Cupertino, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 16/407,166

(22) Filed: May 8, 2019

(65) Prior Publication Data
US 2019/0373456 A1 Dec. 5, 2019

Related U.S. Application Data

(63) Continuation of application No. 16/294,653, filed on Mar. 6, 2019.
(Continued)

(51) Int. Cl.
H04L 29/06 (2006.01)
H04W 12/03 (2021.01)
(Continued)

(52) U.S. Cl.
CPC ........... H04W 12/03 (2021.01); H04L 9/0861 (2013.01); H04L 9/3242 (2013.01);
(Continued)

(58) Field of Classification Search
CPC ........... H04W 12/001; H04W 12/0401; H04W 84/042; H04W 74/0833; H04W 76/30;
(Continued)

(56) References Cited

U.S. PATENT DOCUMENTS

2018/0324869 A1* 11/2018 Phuyal ............... H04W 72/14
2019/0104553 A1* 4/2019 Johansson ............ H04L 1/12
(Continued)

FOREIGN PATENT DOCUMENTS

CN       108702784 A    * 10/2018
CN       110012557 A    *  7/2019   ........... H04W 76/27
WO   WO-2019134566 A1  *  7/2019   ........... H04W 76/30

OTHER PUBLICATIONS

A. Hoglund, D. P. Van, T. Tirronen, O. Liberg, Y. Sui and E. A. Yavuz, "3GPP Release 15 Early Data Transmission," in IEEE Communications Standards Magazine, vol. 2, No. 2, pp. 90-96, Jun. 2018, doi: 10.1109/MCOMSTD.2018.1800002. (Year: 2018).*

Primary Examiner — John B King
(74) Attorney, Agent, or Firm — Kowert Hood Munyon Rankin and Goetzel PC

(57) ABSTRACT

Systems and methods of a security framework for an RRC connection are described. The UE receives a release message that comprises a current Next Hop Chaining Counter (NCC). The UE derives a new $K_{eNB^*}$ using the current NCC and transmits an EDT RA preamble to same or a different base station. After receiving an RAR with an uplink allocation, the UE transmits a RRCConnectionResumeRequest message. The UE transmits uplink data encrypted using $K_{eNB^*}$ if the uplink allocation includes a data allocation sufficient for the data, falls back to a legacy RRC connection procedure in which the stored $K_{eNB^*}$ is discarded and then $K_{eNB^*}$ is re-derived if the data allocation is insufficient for the data due to a CE level change, and falls back to a legacy RRC connection procedure in which the stored $K_{eNB^*}$ is used instead of discarding $K_{eNB^*}$ if the uplink allocation excludes the data allocation.

19 Claims, 5 Drawing Sheets

Related U.S. Application Data

(60) Provisional application No. 62/644,102, filed on Mar. 16, 2018, provisional application No. 62/677,994, filed on May 30, 2018, provisional application No. 62/716,440, filed on Aug. 9, 2018, provisional application No. 62/753,841, filed on Oct. 31, 2018.

(51) Int. Cl.
*H04L 9/08* (2006.01)
*H04L 9/32* (2006.01)
*H04W 12/041* (2021.01)
*H04W 84/04* (2009.01)

(52) U.S. Cl.
CPC ....... *H04W 12/041* (2021.01); *H04L 2209/80* (2013.01); *H04L 2209/805* (2013.01); *H04W 84/042* (2013.01)

(58) Field of Classification Search
CPC ................. H04L 9/3242; H04L 9/0861; H04L 2209/805; H04L 2209/80
See application file for complete search history.

(56) References Cited

U.S. PATENT DOCUMENTS

| | | | |
|---|---|---|---|
| 2019/0215872 A1* | 7/2019 | Park | H04W 52/0216 |
| 2019/0223221 A1* | 7/2019 | Johansson | H04W 76/27 |
| 2020/0068442 A1* | 2/2020 | Lee | H04W 74/0833 |
| 2020/0068547 A1* | 2/2020 | Li | H04L 9/0891 |
| 2020/0187242 A1* | 6/2020 | Hoglund | H04W 52/365 |
| 2020/0187245 A1* | 6/2020 | Fujishiro | H04W 74/002 |
| 2020/0245362 A1* | 7/2020 | Hoglund | H04W 8/24 |
| 2020/0344818 A1* | 10/2020 | Hoglund | H04W 74/0833 |
| 2020/0367294 A1* | 11/2020 | Wong | H04W 48/16 |

* cited by examiner

SECURITY FRAMEWORK FOR MSG3 AND MSG4 IN EARLY DATA TRANSMISSION

PRIORITY CLAIM

This application is a continuation of U.S. patent application Ser. No. 16/294,653, filed Mar. 6, 2019, which claims the benefit of priority under 35 U.S.C. 119(e) to U.S. Provisional Patent Application Ser. No. 62/644,102, filed on Mar. 16, 2018, U.S. Provisional Patent Application Ser. No. 62/677,994, filed May 30, 2018, U.S. Provisional Patent Application Ser. No. 62/716,440, filed Aug. 9, 2018, and U.S. Provisional Patent Application Ser. No. 62/753,841, filed Oct. 31, 2018, each which is incorporated herein by reference in its entirety.

TECHNICAL FIELD

Embodiments pertain to radio access networks (RANs). Some embodiments relate to cellular networks, including Third Generation Partnership Project Long Term Evolution (3GPP LTE) networks and LTE advanced (LTE-A) networks, $4^{th}$ generation (4G) networks and $5^{th}$ generation (5G) or next generation (NG) networks. Some embodiments relate to a security framework for network connectivity.

BACKGROUND

The use of various types of systems has increased due to both an increase in the types of devices user equipment (UEs) using network resources as well as the amount of data and bandwidth being used by various applications, such as video streaming, operating on these UEs. To increase the ability of the network to contend with the explosion in network use and variation, various changes to existing systems are being contemplated to improve network processes. Such network processes may include the security processes for UEs, and in particular security processes used during early data transmission (EDT).

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
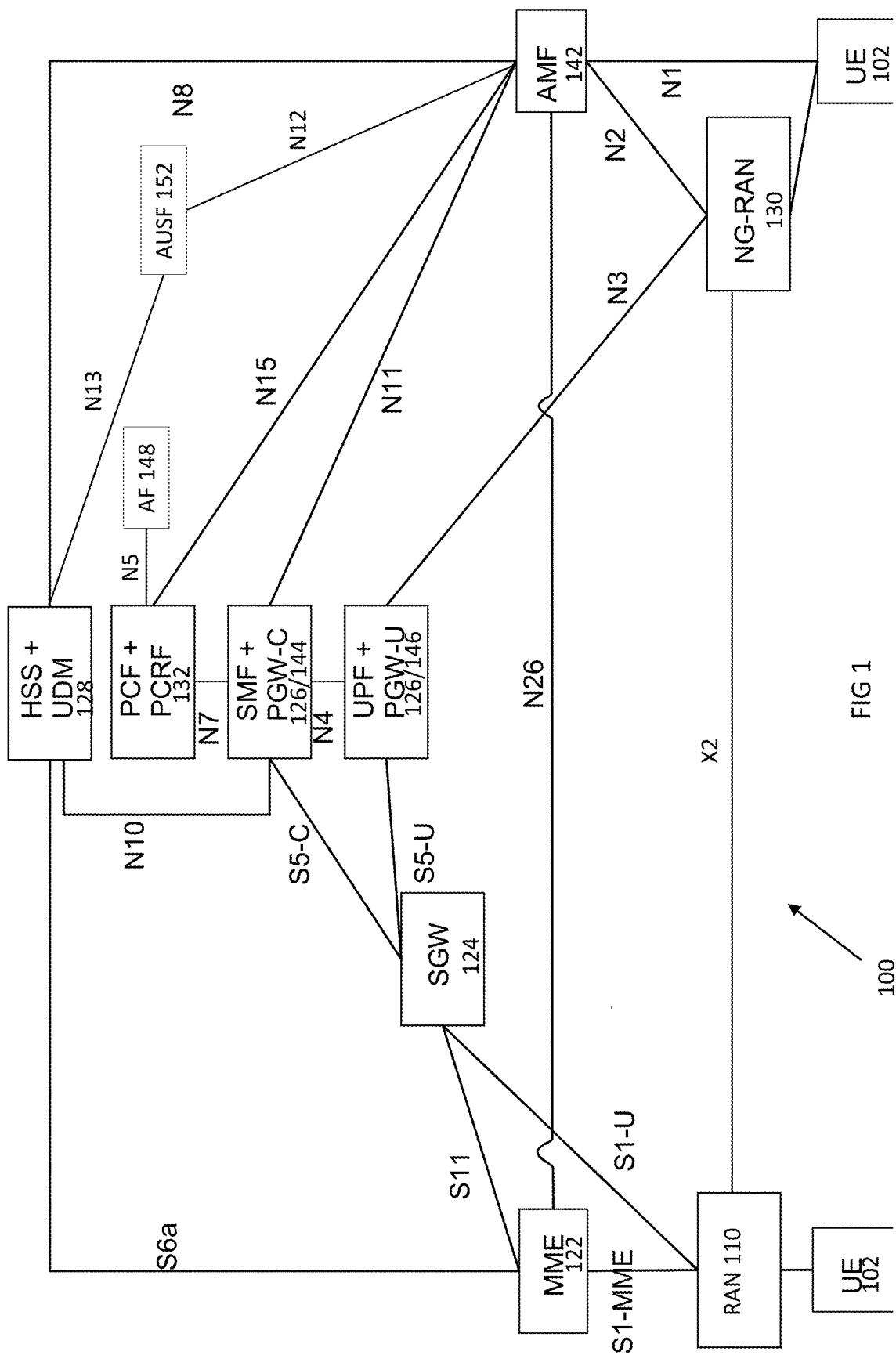
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to either an access network or random access network (RAN) 110 and/or may be connected to the NG-RAN 130 (gNB) or an Access and Mobility Function (AMF) 142. The RAN may be an eNB, a gNB or a general non-3GPP access point, such as that for Wi-Fi. The NG core network may contain multiple network functions besides the AMF 112. The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an Sha interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
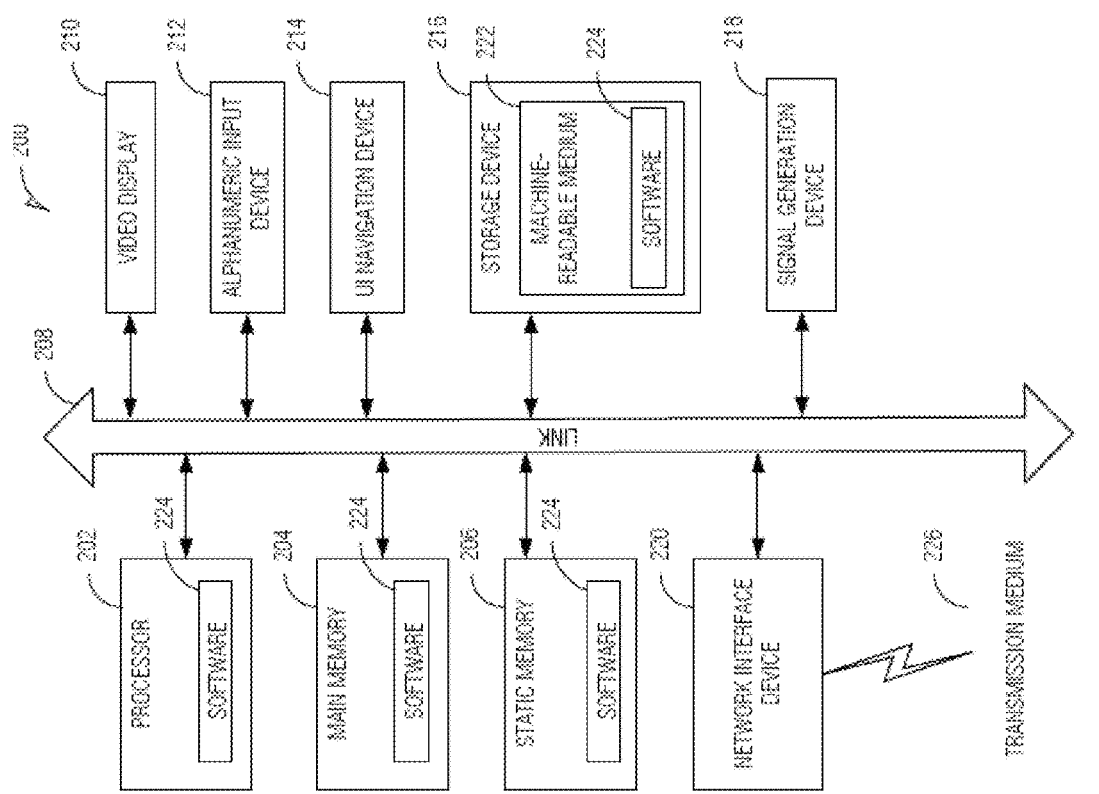
FIG. 2 illustrates a block diagram of a communication device in accordance with some embodiments.

FIG. 2 illustrates a block diagram of a communication device in accordance with some embodiments. In some embodiments, the communication device may be a peer machine in peer-to-peer (P2P) (or other distributed) network environment. The communication device 200 may be a specialized computer, a personal or laptop computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine. In some embodiments, the communication device 200 may be embedded within other, non-communication based devices such as vehicles and appliances.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, interne protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Various RRC messages are provided over the course of the connection between the UE and a RAN. These RRC messages include initial connection messages, such as RRC connection request, RRC connection setup and RRC connection setup, reconfiguration messages, such as RRC connection reconfiguration and RRC connection reconfiguration complete messages, and suspension and release messages, such as RRC Connection Release and RRC Connection Reestablish/Resume messages.

At least some of the RRC messages may involve security procedures, such as the generation of keys. In a legacy RRCConnectionResumeRequest message message, a shortResumeMAC-I message authentication token is calculated taking into account the stored $K_{RRCint}$ which is associated with a previous Next Hop Chaining Counter (NCC) from a previous connection (e.g., a source eNB where the UE RRC connection was suspended). As the RRCConnectionResumeRequest message is transmitted using SRB0 and is thus neither integrity protected nor ciphered, the RRCConnectionResumeRequest message re-uses only the existing key $K_{RRCint}$ for the shortResumeMAC-I calculation. When the UE receives the new NCC in the RRC connection release (Msg4), the UE may derive new access stratum (AS) keys using the key $K_{eNB*}$ derived based on the new NCC. Using the new keys, the UE verifies the integrity protection of the legacy RRC message in the RRC connection release and starts using the keys in the subsequent messages.

In EDT, however, the RRC resume procedure is different from legacy resume procedure. EDT allows one uplink data transmission, optionally followed by one downlink data transmission during the random access procedure. Bandwidth reduced Low complexity (BL) UEs, UEs in coverage enhancement (CE) mode or Narrow Band Internet of Things (NB-IoT) UEs may use EDT. EDT is triggered when the upper layers have requested the establishment or resumption of the RRC Connection for Mobile Originated data and the uplink data size is less than or equal to a transport block size indicated in the system information. The user data is to be protected in the RRCConnectionResumeRequest message (Msg3) and hence the RRCConnectionResumeRequest message also uses a fresh user plane (UP) AS key ($K_{UPenc}$) before sending the RRCConnectionResumeRequest message. Therefore, the new fresh AS keys ($K_{RRCint}$, $K_{RRCenc}$ and $K_{UPenc}$) are derived from $K_{eNB*}$ that is either derived from the currently active $K_{eNB}$ of the source cell (referred as horizontal derivation assuming same old NCC) or derived from the NH associated with the new NCC (referred as vertical derivation). Whether the derivation is horizontal or vertical, the UE may obtain a new $K_{eNB*}$ for the derivation of fresh keys.

Figure 3:
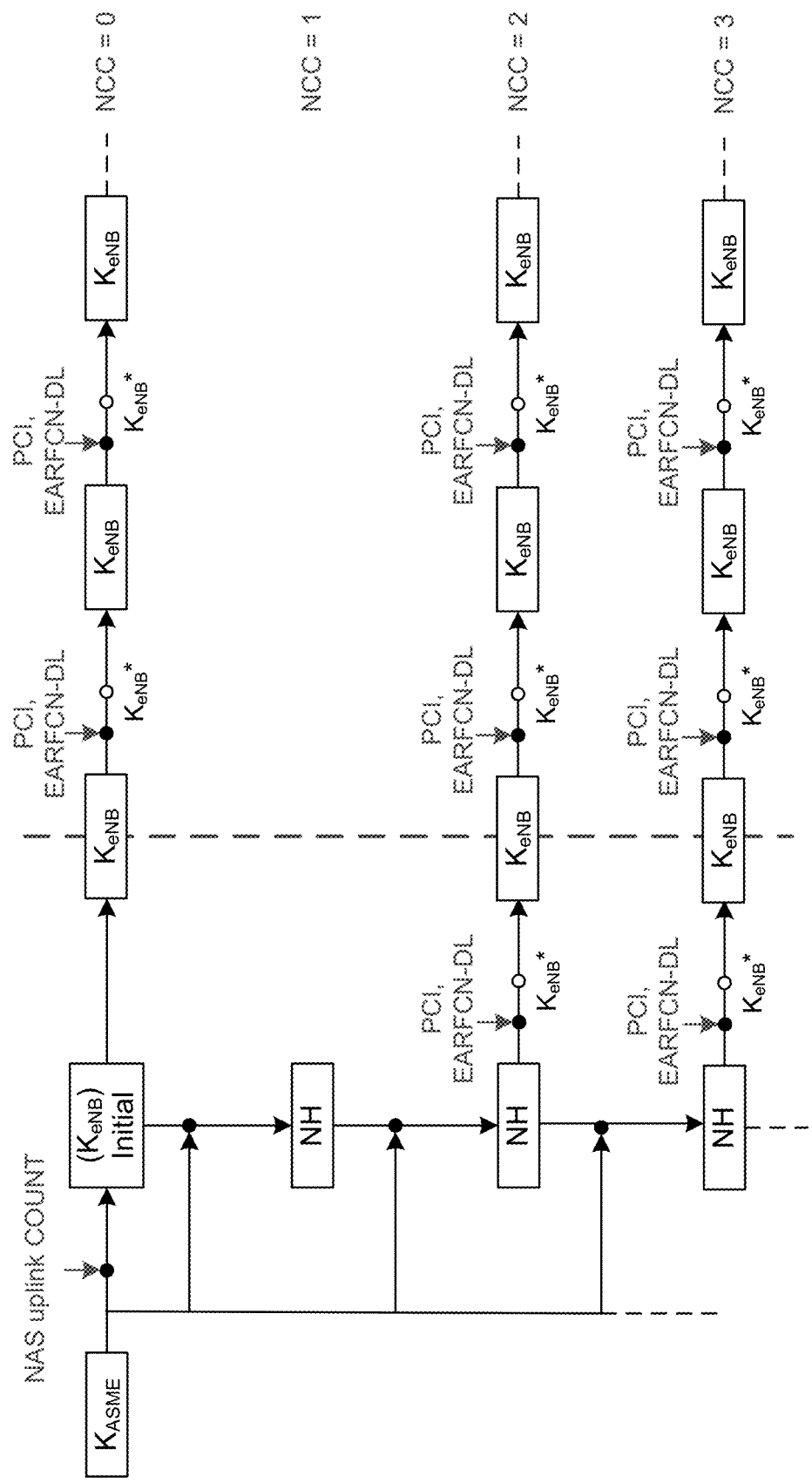
FIG. 3 illustrates key handling in accordance with some embodiments.

FIG. 3 illustrates key handling in accordance with some embodiments. As shown in FIG. 3, when a UE receives a value of NCC from the eNB and determines that the NCC value is different from the stored NCC value, the UE derives the new keys using vertical derivation from the NH associated with new NCC. Similarly, in EDT if UE received new NCC in the previous connection (for example, a previous Msg4 or in an RRC suspend message) and the NCC is unused, the UE can perform vertical derivation from the NH parameter to derive keys before sending Msg3. If the UE received the same value of the currently used NCC in the previous connection or the UE already used the new NCC received in the previous connection, the UE can perform a horizontal derivation from $K_{eNB}$ to derive new keys before sending Msg3 in EDT.

$K_{ASME}$ is the MME (ASME) Base/Intermediate key that is derived in the HSS and UE from the Cipher key and Integrity key (which are derived in the USIM using AKA) using AKA. $K_{eNB}$ is the eNB Base key, which is an intermediate key derived in MME and UE from $K_{ASME}$ when the UE transits to ECM CONNECTED STATE or by UE and target eNB from $K_{eNB*}$ during handover. $K_{eNB*}$ is the eNB handover transition key, which is an intermediate key derived in source eNB and UE during handover when performing horizontal ($K_{eNB}$) or vertical key (NH) derivation. It is used at target eNB to derive $K_{eNB}$. $K_{RRCint}$ is an encryption key for protection of RRC data derived in the eNB and the UE. $K_{UPenc}$ is the encryption key for protection of user plane data derived in eNB and UE. All EPS security keys may be 256 bits in length. The ciphering and integrity keys for AS and NAS algorithms may use only the 128 Least Significant Bits (LSB) of the derived keys.

Figure 4:
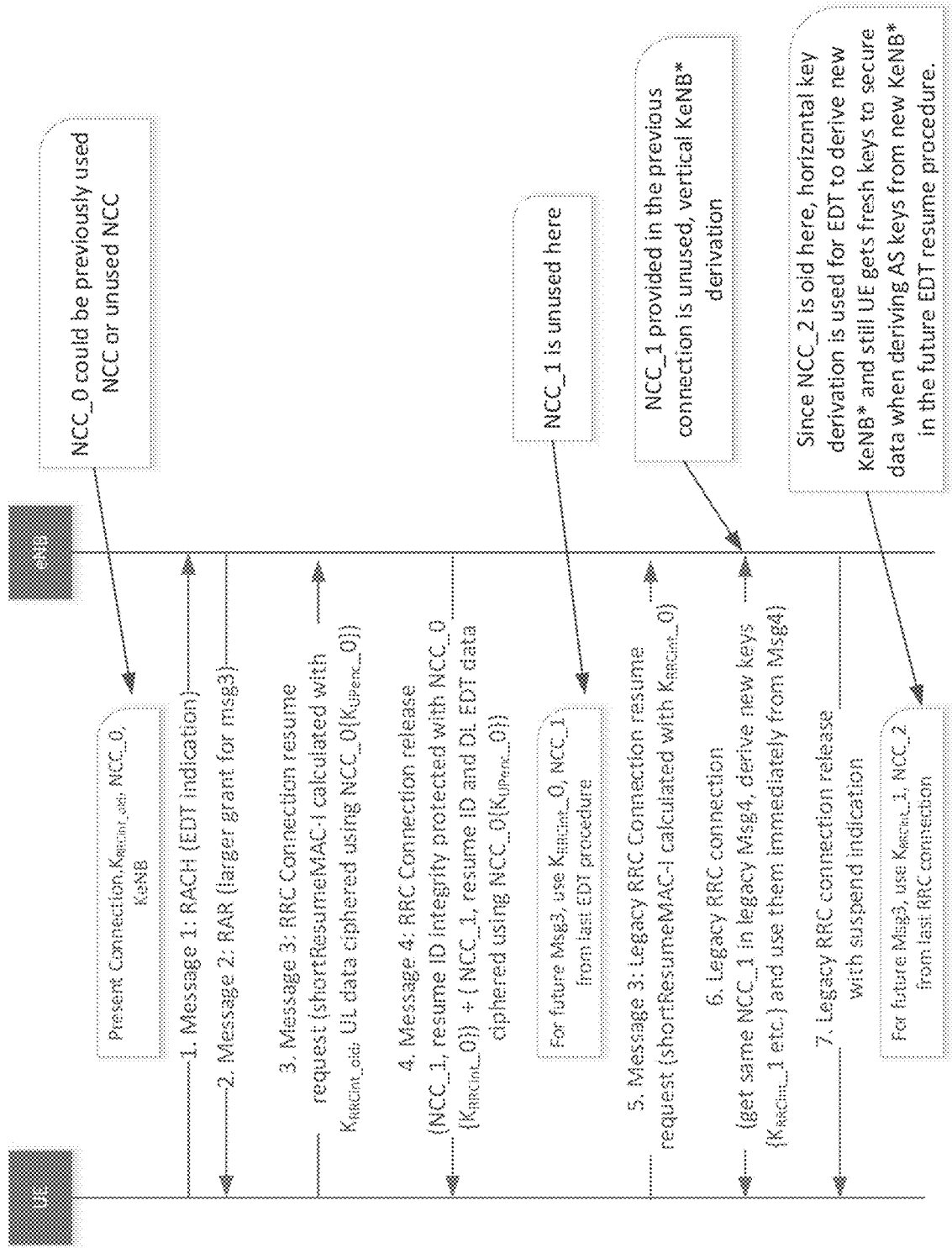
FIG. 4 illustrates radio resource control (RRC) message exchange in accordance with some embodiments.

FIG. 4 illustrates RRC message exchange in accordance with some embodiments. The overall framework of using NCC for EDT following legacy UE behavior wherever possible is shown in FIG. 4. As is evident, unlike the legacy resume procedure, the UE does not transition from the RRC_Idle state to the RRC_Connected state during EDT. Similar to the legacy procedure, the UE may send a RACH Request (Msg1) in the RACH procedure. In general, a UE in the RACH group may synchronize to the network using the RACH procedure. The RACH Request may contain an EDT indication.

The RACH request may be transmitted by the UE to the eNB using a RACH resource. For example, the RACH request may be transmitted over 6 Resource blocks. The RACH request may contain a preamble index, which may be randomly selected based on the size of the RRC connection request from preamble information in system information block (SIB). However, the RACH Request for EDT may use a unique preamble that is different from that used for a legacy procedure.

The eNB, having received the RACH request may allocate a temporary Cell Radio Network Temporary Identifier (C-RNTI) for the UE. The temporary Cell RNTI may be transmitted to the UE in a RACH Response message (RAR-Msg 2) from the eNB. The RAR message may also contain the appropriate timing advance (TA) for the UE, determined by the eNB. The RAR message may contain a scheduling grant for the UE to send a RRCConnectionResumeRequest message, where the scheduling grant may indicate whether frequency hopping is to be used as well as the resource block assignment. The RAR message may further indicate the modulation and coding scheme and the power for the PUSCH to be used by the UE. If EDT is to be used, the UL grant in the RAR message may be larger than that of a legacy RAR grant to provide additional UL resources for transmission by the UE of a UL message in addition to a RRCConnectionResumeRequest message.

When the UE receives the UL grant in RAR for EDT, as in legacy, the UE may transmit a RRCConnectionResumeRequest message including a shortResumeMAC-I calculated using currently stored $K_{RRCint}$. The UE may also derive the new key ($K_{UPenc}$) to cipher the UL user plane (UP) data in a Dedicated Traffic Channel (DTCH) and multiplex the UL UP data with the RRC message to transmit in Msg3.

When UE receives Msg4 (the RRCConnectionRelease message), the RRC message in the Dedicated Control Channel (DCCH) is integrity protected using the key ($K_{RRCint}$) generated prior to the transmission of Msg3 and DL data in the DTCH is ciphered using the key ($K_{UPenc}$) that was also generated prior to the transmission of Msg3. Since the AS security is active and the Packet Data Convergence Protocol (PDCP) is already established, the PDCP layer performs the verification of the integrity protection of the RRC message in DCCH.

In some cases, a UE may be suspended by an eNB that supports EDT and resumes in a legacy eNB that does not support EDT, the UE may perform the legacy resume procedure. However, when the UE is suspended by a legacy eNB that does not support EDT and resumes in an eNB that supports EDT to initiate EDT, the UE derives new keys based on the currently stored value of NCC before sending Msg3. The UE and eNB may be out-of-sync if the legacy eNB has an unused NCC.

For example, assuming that the UE is currently using NCC_0, as shown in FIG. 4, the UE may have resumed in the same cell of a Rel-14 network or network that does not support EDT. In this case, the network may have new NCC_1 provided by the MME. In particular, the MME may store a fresh NCC and send the new NCC to the eNB in the S1-AP UE Context Resume Response message. However, because the eNB does not support EDT, the eNB may not provide the NCC_1 to the UE during the suspend procedure (prior to the RACH transmission). The UE is thus unaware of the new NCC_1 provided by the MME until the UE engages in a new resumption or re-establishment of the RRC connection, or handover is performed.

If the UE moves to a target eNB in a Rel-15 network that supports EDT and starts the RRC resume procedure for EDT, the UE may continue to use the old NCC_0 to initiate EDT. However, the legacy source eNB may use the unused NCC_1 to derive $K_{eNB}*$. That is, if the source eNB has a fresh {NH, NCC} pair from the MME then the fresh pair may be used and the fresh NH may be used in the new $K_{eNB}*$ derivation. Moreover, the AS security context sent to the target eNB may include the new derived $K_{eNB}*$, the NCC associated to the $K_{eNB}*$. In this case, deciphering of UL data can result in a corrupted packet due to the differences between the NCC used by the eNB and that used by the UE.

Various solutions to these issues may include that the eNB rejects the connection from the UE during the RRC connection resumption process. Alternatively, the UE may not use EDT in the resume procedure if the RRC connection was suspended by a legacy eNB that did not support EDT in the previous connection. In another embodiment, the UE may determine whether or not it received the NCC in the previous connection or previous suspend procedure and if it did not receive the NCC in the previous connection or previous suspend procedure, the UE may avoid using EDT in the resume procedure. In another embodiment, the UE may echo back (i.e., transmit) the used {KeNB*, NCC} pair in Msg3 using a Medium Access Control (MAC) Control element (CE) or PDCP control packet data unit (PDU). If source eNB provided different {KeNB*, NCC} pair to target eNB, the target eNB derives keys using $K_{eNB}*$ provided by the UE in msg3.

In some cases, a UE may be suspended by a Rel-15 eNB that has disabled EDT and resumed in a (source) eNB that has enabled EDT. In this case, a change in legacy behaviour at the network side may be provided if the eNB decides to move the UE in the RRC_CONNECTED mode after receiving RRCConnectionResumeRequest for EDT. Assuming that the UE is using NCC_0, the UE connection is suspended and the eNB has new fresh NCC_1. The eNB has not delivered NCC_1 to the UE yet because the eNB is currently disabling the EDT feature. However, the eNB is capable of supporting EDT or new Rel-15 eNB. Now, the UE resumes the connection in a different target eNB and the UE still uses the old NCC_0.

In some embodiments, as above, the UE may determine whether or not it received the NCC in the previous connection or previous suspend procedure and if it did not receive the NCC in the previous connection or previous suspend procedure, the UE avoids using EDT in the resume procedure.

In some embodiments, the source eNB may decide to move the UE to the RRC_CONNECTED state and provide only KeNB* and the associated NCC_1 to the target eNB. In this case, the target eNB may provide the new NCC_1 in the RRCConnectionResume message as mandatory in Msg4 and the UE may be unable to ignore the new NCC_1.

In some embodiments, the target eNB may decide to move the UE to the RRC_CONNECTED state. This means that the source eNB may provide KeNB* and the associated NCC_0 for EDT to the target eNB, as well as providing KeNB* and the associated NCC_1 to move the UE to the RRC CONNECTED state. In other embodiments, the source eNB may always provide KeNB* and associated NCC_0 and any unused NCC_1, if any, to the target eNB. In both of these embodiments, the target eNB has option to provide either the old NCC_0 or the new NCC_1 in Msg4 when Msg4 contains a legacy RRCConnectionResume message. In this case, if NCC_0 is provided in Msg4, the UE ignores NCC_0 and keeps using current keys for subsequent messages because the UE has already derived the keys associated with NCC_0 before sending Msg3. If NCC_1 is provided in Msg4, then the UE may follow the legacy procedure and derive new keys using KeNB* that is derived with vertical derivation as the UE has received a new NCC.

In some cases, the eNB may reject the EDT request of the UE if the MME is down, the AS security context has been lost or there is network congestion. If the eNB rejects the RRCConnectionResumeRequest message from the UE due to network congestion or AS security context being lost, the eNB may be unable to derive any keys. In this case, if the UE goes back to IDLE mode with a suspend indication, the UE and eNB may have a different value of the keys. Therefore, after the connection reject, the UE may not derive new key and may instead use the same key for the calculation of shortResumeMAC-I in Msg3 in the next resume procedure for EDT. When using same key, however, there is risk of a replay attack as the UE uses the same resume ID and shortResumeMAC-I in Msg3 in the next resume procedure. To combat this, the UE may use the newly derived key (KRRCint) for every calculation of shortResumeMAC-I in Msg3 in every attempt of the RRC connection resume procedure. In this case, the UE may count how many times the key is derived from the first attempt of the unsuccessful ongoing resume procedure. The count may be included in Msg3 as a MAC CE or PDCP control PDU. The eNB may also derive the key for the same number of times to be in-sync with the UE.

In some cases, a UE may fall back due to a legacy grant in the RAR. In particular, when a UE initiates EDT by using a PRACH resource corresponding to EDT and receives a legacy UL grant in RAR for the legacy Msg3, the UE may be unable to send UL data. Instead, the UE may send the legacy RRCConnectionResumeRequest message. The UE may activate AS security during the construction of the RRC message for Msg3 in EDT. The RRC sends the RRC message for EDT to lower layers so that the lower layers can initiate EDT using the RACH procedure. Since the UL data should also be in the transmission buffer in RLC, the RRC connection may resume the dedicated radio bearers (DRBs) and AS security so that PDCP can encrypt the user UL data.

When the UE receives the UL grant in RAR, the UE can ask the Assembly and Multiplexing entity to get the MAC PDU to transmit from the transmission buffer. In this case, the UE may derive new AS keys prior to receiving the RAR. However, when the UL grant is not sufficient, the UE may fall back to the legacy procedure. If the UE follows the legacy procedure, then the UE may rederive new keys when the UE receives the legacy RRCConection Resume message in Msg4. However, deriving KeNB* a second time could make the UE and eNB out of sync if the eNB derives KeNB* only once (as the eNB received the preamble from the UE and in response sent the legacy UL grant in the RAR) while the UE derived KeNB* twice using same value of NCC in the same RRC connection.

To avoid this issue, the UE may use the same AS keys in case of fallback to the legacy RRC connection procedure if the AS keys are derived (security is activated) during the construction of the RRC message for Msg3 prior to receiving the RAR in EDT. However, unlike the legacy procedure, in which the UE resumes all SRBs and DRBs and re-establishes the AS security, the AS security has already been established, thus, these procedures are skipped by the UE. Similar to the legacy procedure, however, the UE may enter the RRC_CONNECTED state. In addition, in the fallback to the legacy procedure, in response to receiving the RRCConnectionResumeRequest from the UE, the RRCConnectionResume from the eNB may include a dummy NCC (e.g., a NCC that has an invalid value) as the UE and eNB are using the correct NCC. The dummy NCC number may be ignored by the UE and the eNB in subsequent legacy steps as AS security has already been established and the NCC value is current.

Alternatively, the UE may follow the legacy procedure in case of fallback to the legacy RRC connection procedure if the AS keys are derived (security is activated) during the construction of RRC message for Msg3 after receiving the RAR in EDT. In this latter embodiment, when the UE receives the UL grant in the RAR for Msg3, the MAC layer may indicate to the RRC layer to construct the RRC message. In this case, it is assumed that there is enough processing time before the scheduled UL transmission time.

In another fallback scenario, the UE may fall back due to a change in the coverage enhancement (CE) level during power ramping. In this scenario, when the UE does not receive the RAR in response to the preamble transmission for EDT, the UE may change the CE level due to power ramping. When the CE level is changed, the maximum transport block (TB) size that can be transmitted in EDT is changed. Due to this change, the UL data or Msg3 may not fit in a single transmission. In this case, the UE fall backs to the legacy procedure.

To avoid this issue, in some embodiments, the KeNB may not be updated if the NCC received by the UE in Msg4 is the same as that already stored by the UE. In this case, when the UE falls back to the legacy resume procedure to send the legacy preamble, the UE may revert to the configuration prior to sending the preamble for EDT in Msg1. When the UE receives the RRCConnectionResume message in Msg4 after initiating the legacy resume procedure, the UE may check the NCC. If the NCC provided in Msg4 is same as the currently stored NCC, the UE may not update the KeNB.
Then, the UP keys (KRRCint, KRRCenc and KUPenc) may be derived using the KeNB. In another embodiment, the UE does not derive the keys and uses the same UP keys (KRRCint, KRRCenc and KUPenc). If the NCC provided in Msg4 is different from the currently stored NCC, the UE may perform a vertical derivation of the KeNB and derive new UP keys.

In some embodiments, multiple KeNBs may be stored. For example, when two KeNBs are stored, one may be the old KeNB and the other the new KeNB that is derived based on the NCC that was provided in the RRCConnectionRelease message with the suspend indication in the previous connection. In this case, when the UE activates the AS security (deriving KeNB and AS Keys) before sending the RRCConnectionResumeRequest message for EDT, the UE may store the new KeNB as well as the old KeNB if horizontal derivation is performed based on the NCC. The new KeNB may be derived based on the old KeNB. If vertical derivation is performed, the UE may store only the new KeNB. In case of this fallback scenario, the UE may delete the new KeNB and keep only the old KeNB. Unlike the above embodiment, in which fallback occurs due to a legacy grant being provided in the RAR message, similar to the legacy procedure the UE resumes all SRBs and DRBs and re-establishes the AS security using the old KeNB before entering the RRC_CONNECTED state. Thus, the UE may recalculate the new KeNB in response to the legacy grant. If there is no old KeNB, the UE may not store any KeNB.

In this fallback scenario, if the NCC provided in Msg4 is same as the stored NCC, the UE may perform horizontal derivation of the KeNB when the UE has a stored value of the KeNB. If the UE has no stored value of the KeNB, the UE may always derive the KeNB based on the currently stored NH count and the NCC. If NCC provided in Msg4 is different than the stored value of NCC, the UE may always perform the vertical derivation of the KeNB.

In some embodiments, a RRCConnectionReject message may be received in response to the RRCConnectionResumeRequest message for EDT. The reception of the RRCConnectionReject message may indicate to the UE that at least one of the messages between the eNB and the MME, and between the MME and SGW (i.e., UEContextResumeRequest message, Modify Bearer message, UEContextResumeResponse message, Suspend procedure message) was unsuccessful. In this case, when the UE receives the RRCConnectionReject message with a suspend indication in response to the RRCConnectionResumeRequest message, the UE may enter the IDLE mode with a suspend indication and store the AS context. In the next resume procedure for EDT, the UE may activate AS security before sending the Msg3.

When the RRCConnectionReject message may be received in response to the RRCConnectionResumeRequest message for EDT, in some embodiments, the UE may store two old KeNB and a new KeNB when horizontal derivation is performed to derive the new key. When entering IDLE mode with a suspend indication, the UE may delete the new KeNB and store the old KeNB. If there is no old KeNB, the UE may not store any KeNB. In the next resume procedure for EDT, if the UE has a stored value of the KeNB, the UE may perform the horizontal derivation of the KeNB—otherwise the UE may perform a derivation of the KeNB based on the stored values of NH and NCC. Similarly, in the next legacy resume procedure, if the NCC provided in Msg4 is same as the stored NCC, the UE may perform horizontal derivation of the KeNB when the UE has a stored value of the KeNB. If the UE has no stored value of KeNB, the UE may always derive the KeNB based on the currently stored NH count and the NCC. If the NCC provided in Msg4 is different than the stored value of NCC, the UE may always perform the vertical derivation of the KeNB.

Alternatively, the UE may store only one KeNB. If a RRCConnectionReject message is received by the UE after initiating EDT, the UE may not update the KeNB in the next resume procedure in the same cell. Using the same KeNB, the UP keys may be derived in the next resume procedure for EDT before sending Msg3. In another embodiment, the UE may store both the KeNB and UP Keys and may not derive any keys in the next resume procedure for EDT in the same cell.

In some cases, if a legacy resume procedure (no EDT) is started in the next resume procedure, and if the NCC provided in the Msg4 is same as the stored NCC, the UE may not update the KeNB and instead use the same KeNB, while the UP keys are derived. In another option, the UE may not derive any keys and instead use the same stored KeNB and UP keys. If the NCC provided in Msg4 is different than the stored NCC, the UE may always perform vertical derivation of KeNB.

Other issues may involve handling different AS security context in the UP EDT process. In EDT for a UP solution, if the UE has received a NCC in the RRCConnectionRelease message in the preceding connection, the UE can initiate the EDT. In this case, the old KRRCint key may be used to calculate the shortResumeMAC-I. Thus, when the UE is released to the IDLE mode with a suspend indication and provided a new NCC for the next resume procedure for EDT, the UE may use the currently stored old KRRCint to calculate the shortResumeMAC-I before deriving new keys using the NCC. After calculating shortResumeMAC-I, the UE may derive new keys and store two sets of AS security—one corresponding to the old KRRCint and the other corresponding to the new KRRCint—until the resume procedure fails or succeeds.

If the UE receives a RRCConnectionReject message in Msg4, the UE may discard the new AS security corresponding to the new KRRCint so that the UE uses the same KRRCint to calculate the shortResumeMAC-I in the next resume procedure. Similarly, when the UE receives the RRCConnectionRelease message with a suspend indication in Msg4, the EDT procedure is complete. In this case, the UE may also delete the old AS security keys. Also, when the UE falls back to the RRC_CONNECTED state upon reception of a legacy RRCConnectionResume message in response to a RRCConnectionResumeRequest for EDT, the UE may discard the old security context corresponding to the KRRCint that was used to calculate the shortResumeMAC-I.

In some cases, after deriving new key for EDT procedure, the resume procedure may fail due to cell reselection, which may lead to the MAC being reset. Similarly, when the UE reselects a cell during the Random Access Procedure for EDT, or when timer T300 expires after initiating EDT, the UE may also discard the new security context as the UE restarts the resume procedure. However, if the UE resumes in a different eNB than the eNB where the UE was previously suspended and resume failure happens due to cell reselection, there is risk of keys mismatch between the UE and eNB as same key cannot be used in two different eNBs. The UE may also transmit the RRCConnectionResumeRequest message for EDT and re-select a cell before receiving Msg4.

In this case, following scenarios are possible: the eNB did not receive Msg3. In this case, the eNB has not derived the new keys, so the old KRRCint is still used for shortResumeMAC-I verification. Alternatively, the eNB may have received Msg3 and sent Msg4 (RRCConnectionRelease with the new NCC) but the UE may or may not receive Msg4. In this case, shortResumeMAC-I may be verified by the old KRRCint and the eNB may now have a new set of Keys (corresponding to new KRRCint).

In the former scenario, a resume procedure for EDT may be considered a failure and the UE may delete the new security context corresponding to the new KRRCint that was derived after the calculation of the shortResumeMAC-I. The UE may return to the IDLE mode with a suspend indication.

In the latter scenario, various embodiments may be considered. In a first embodiment, if the UE resumes in the same cell where the UE was previously suspended, the resumption is handled by the source eNB. If the eNB is unable to verify that Msg4 for EDT is successfully received by the UE, the eNB may attempt with both the new and old KRRCint (assuming new NCC provided in Msg4 for EDT is either received or not) to verify shortResumeMAC-I in the next resume procedure. In this case, the resume procedure for EDT may be considered failure and the UE may delete the new security context corresponding to the new KRRCint that was derived after the calculation of the shortResumeMAC-I. The UE may then return to the IDLE mode with a suspend indication.

In a second embodiment, if the UE resumes in a different cell than the cell where the UE was previously suspended, the UE may enter the RRC IDLE mode without a suspend indication with a release cause "other" or "RRC connection failure." In this case, the UE may either use a control plane (CP) solution for EDT or initiate the legacy RRC connection establishment procedure next time.

Alternatively, for both the first and second embodiment, the UE may enter the RRC_IDLE mode without a suspend indication with release cause "other" or "RRC connection failure." In this case, the UE may either use a CP solution for EDT or initiate the legacy RRC connection establishment procedure next time.

Figure 5:
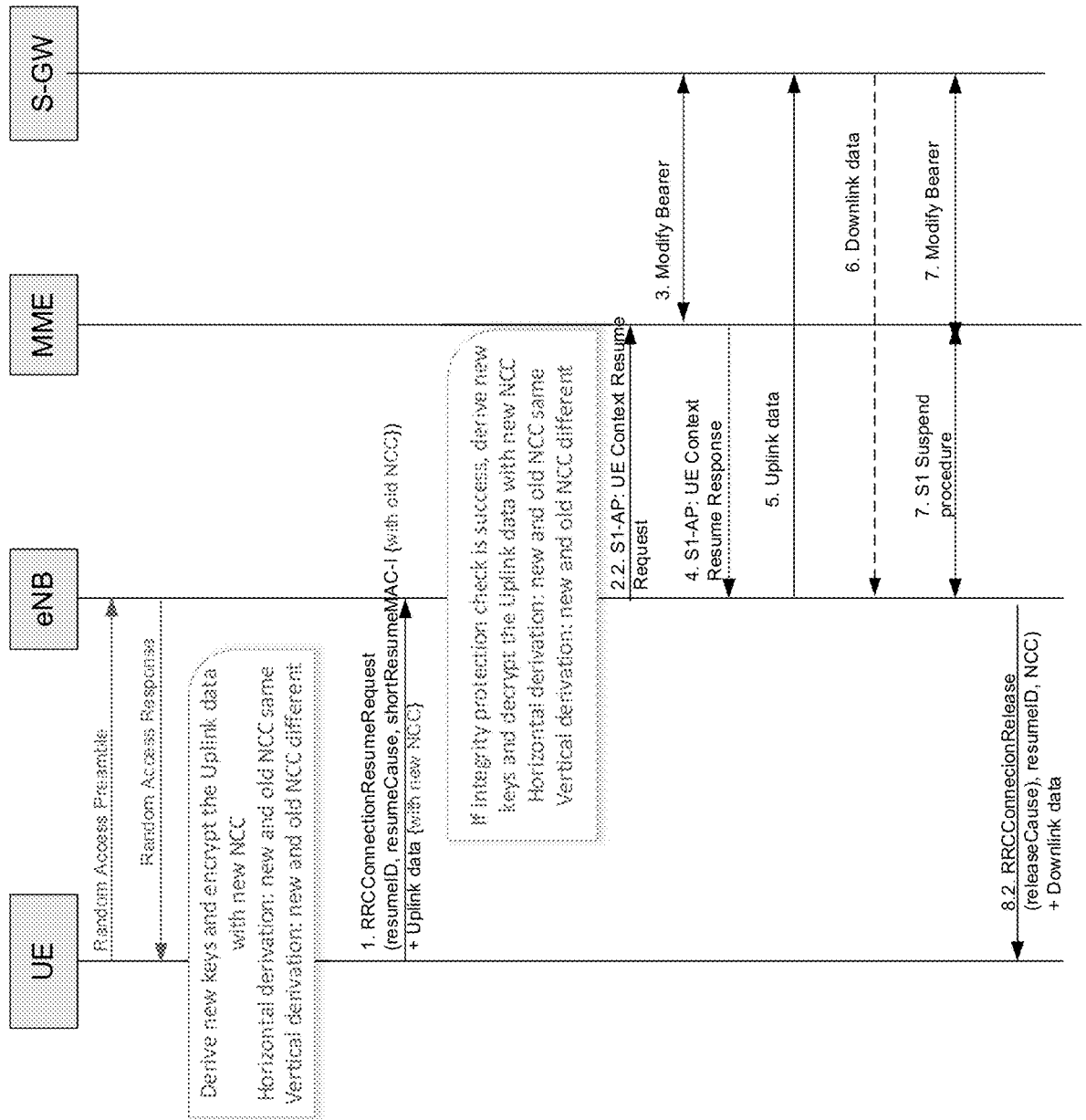
FIG. 5 illustrates a resumption procedure in accordance with some embodiments.

FIG. 5 illustrates a resumption procedure in accordance with some embodiments. In particular, FIG. 5 illustrates various messages between the UE, the eNB, the MME and S-GW in a EDT resumption procedure with new and old NCC handling. As shown in FIG. 5, when the eNB completes the EDT in Msg4 (RRCConnectionRelease message in Msg4), the eNB may provide a new NCC that can be different than the NCC used in Msg3 and Msg4. In the next resume procedure, the shortResumeMAC-I calculation may be associated with the old NCC, whereas the new NCC may be used to derive new keys and encrypt the user data in Msg3. The key derivation (KeNB*) may be either horizontal or vertical. If the old and new NCC values are same, horizontal derivation may be used, otherwise vertical derivation may be used. Once KeNB* is derived, further AS keys (KRRCenc, KRRCint and KUPenc) may be derived. Therefore, the UE and eNB may be synchronized on the difference of the old NCC and new NCC to correctly perform the derivation of keys.

Also, Msg4 may be lost, as described above. In this case, the UE may not receive the new NCC provided in the lost Msg4. This would mean the UE still has old NCC, whereas the eNB has the new NCC. Therefore, the eNB may store the old NCC as well as the new NCC. Various options can be considered to handle the old and new NCC.

In a first option, a single NCC may be stored. In this case, if the received NCC in the RRCConnectionRelease message is same as the stored one, the UE may simply store one NCC or ignore the new NCC. In the next resume procedure, the KeNB* derivation may be based on current KeNB (considered flag=0). On the other hand, if the received NCC in the RRCConnectionRelease message is different from the stored one, the KeNB may be derived and the NH updated immediately. In this case, the received NCC may be stored and, during the next resume procedure the KeNB* derivation may be based on the NH (considered flag=1). When the next resume procedure is a legacy resume procedure (not applicable to the RRC INACTIVE mode), the UE may receive the new NCC in a RRCConnectionResume message (in Msg4) and determine whether the currently received NCC is same as the stored one and whether the currently received NCC is different than the stored one. If the currently received NCC is same as the stored one, if flag=0, the UE may continue using the current KeNB to derive the keys immediately, while if flag=1, the UE may continue using the NH to derive the keys immediately. If the currently received NCC is different than the stored one, the UE may use vertical derivation, i.e., derive the new NH and use the new NH immediately to derive the keys.

In a second option, multiple NCCs may be stored. In this case, either the same or different NCCs may be stored. When different NCCs are stored, two different NCC old (for example, =2) and NCC new (for example, =5) may be stored. For the RRC_INACTIVE state and EDT in the next resume, the NCC new (=5) may be used compared with the old NCC (=2) to derive the key, i.e. via vertical derivation. When a next legacy resume procedure is used (not applicable to the RRC_INACTIVE state), the UE may receive another new NCC in Msg4 and compare with the last used NCC (i.e., =2). The UE may use the new received NCC (compare with old NCC (=2) to derive key). The UE may also engage in vertical derivation i.e., derive the new NH and use the new NH immediately to derive the keys. This is to say that before KeNB* key derivation, the UE may decide whether vertical or horizontal derivation is to be used by comparing two NCCs. For example, when the UE stores NCC1 and NCC2 (where NCC1 is the old NCC and NCC2 is latest unused NCC received in the suspend message), if the UE initiates EDT, the UE may compare NCC2 with NCC1 before transmitting the preamble (Msg1). If, however, the UE initiates a legacy RRC connection, the UE may wait until Msg4 (RRCConnectionResume) and receive a new NCC (NCC3). The UE may then compare only NCC3 with NCC1 (not with NCC2) and derive KeNB* using vertical or horizontal derivation accordingly.

When the same NCCs are stored, the same NCC old (for example, =2) and NCC new (for example, =2) may be stored. For the RRC INACTIVE state and EDT in the next resume, NCC new (=2) may be used (compare with old NCC (=2) to derive key, i.e. horizontal derivation). When a next legacy resume procedure is used (not applicable to the RRC_INACTIVE state), the UE may receive another new NCC in Msg4 and compare the new NCC with the last used NCC (i.e., =2). When the newly received NCC (for example=2) is the same as current NCC (=2): the UE may employ horizontal derivation i.e., use the current KeNB immediately to update the KeNB* and derive the keys. When the newly received NCC (for example=4) is same as the current NCC (=2): the UE may employ vertical derivation i.e., derive the new NH and use the new NH immediately to derive the KeNB* and keys.

Thus, in various embodiments, where the UE is suspended by a legacy source eNB that does not support EDT and resumed in a target eNB that supports EDT, the eNB always rejects EDT request or moves the UE to RRC_CONNECTED. The UE does not use EDT in the resume procedure if it was suspended by a legacy eNB that did not support EDT in the previous connection. Where the UE is suspended by a Rel-15 eNB that has disabled EDT without providing NCC and resumed in an eNB that has enabled EDT, the UE may move to RRC_CONNECTED when the EDT request is sent. The source eNB may decide to move the UE to RRC_CONNECTED and provide only KeNB* and associated new unused NCC to the target eNB. The target eNB may provide the new NCC in the RRCConnectionResume message as mandatory in Msg4. The target eNB may decide to move the UE to RRC_CONNECTED, the source eNB may provide KeNB* and an associated old used NCC for EDT to the target eNB and additionally provide KeNB* and the associated new unused NCC for moving the UE to RRC_CONNECTED. The source eNB may provide KeNB* and the associated old used NCC and any unused NCC, if any, to the target eNB. The eNB may decide to use either the old NCC or new NCC. The UE may fall back to a legacy resume procedure due to a legacy UL grant being received in RAR for legacy Msg3, and use the same AS security keys if the AS keys are derived (security is activated) during the construction of the RRC message for Msg3 prior to receiving the RAR in EDT. The UE may fall back to a legacy resume procedure due to a legacy UL grant being received in RAR for legacy Msg3, and derive new AS security keys based on the stored NCC if the AS keys are derived (security is activated) during the construction of the RRC message for Msg3 after receiving RAR in EDT. The UE may not use EDT in the resume procedure if it didn't receive a value of NCC in the previous connection or previous suspend procedure or may use EDT in the resume procedure using the currently stored value of NCC even if it didn't receive NCC in the previous suspend procedure. The UE may not initiate EDT in the resume procedure if it received a RRCConnectionReject message in the previous resume attempt or the previous resume attempt was unsuccessful. The UE may store the old KeNB, if any, and the new KeNB when the UE derives the new KeNB (updated from KeNB*) during the construction of the RRC message for the resume procedure for EDT. The UE may delete the new KeNB and store the old KeNB, if any, when the UE falls back to the legacy procedure to send a legacy preamble due to a CE level change during a Random Access Procedure for EDT. The UE may delete the new KeNB and store old KeNB, if any, when the UE receives s RRCConnectionReject with suspend indication in response to s RRCConnectionResumeRequest message for EDT. The UE may derive keNB based on the stored value of the NH count and the NCC (same as a vertical derivation) if the UE has no stored value of KeNB or perform a horizontal derivation of KeNB if the UE has a stored value of KeNB when the NCC provided in RRCConnectionResume message in Msg4 is the same as the stored value of NCC. The UE may derive KeNB based on the stored value of the NH count and NCC if the UE has no stored value of KeNB or perform horizontal derivation of KeNB if the UE has a stored value of KeNB in the next resume procedure for EDT. The UE may not update KeNB when the NCC provided in the RRCConnectionResume message in Msg4 is the same as the stored value of NCC. The UE may not update the KeNB and use the same KeNB and derive new AS keys (KRRCint, KRRCenc and KUPenc) when the UE falls back to a legacy procedure to send a legacy preamble due to a CE level change during a Random Access Procedure for EDT. The UE may not update the KeNB and use the same KeNB and the same AS keys (KRRCint, KRRCenc and KUPenc) when the UE falls back to a legacy procedure to send a legacy preamble due to a CE level change during the Random Access Procedure for EDT. The UE may revert to the original old KeNB or NH and NCC pair to and restart EDT deriving new keys when a new cell is selected after initiating EDT (i.e., after deriving new keys for EDT), or after receiving a RRCConnectionReject message in response to a RRCConnectionResumeRequest message for EDT. The old security context corresponding to the KRRCint that was used to calculate the shortResume-MAC-I may be discarded when the UE receives a RRCConnectionResume message or a RRCConnectionRelease message in response to a RRCConnectionResumeRequest for EDT or in response to Msg3 that is sent after the EDT preamble in Msg1. The UE may initiate an UP EDT in the same cell where the UE was moved to IDLE with a suspend indication in the preceding connection and fail to resume before receiving Msg4, the UE may discard the new security context and move to IDLE with a suspend indication. The UE may move to IDLE without a suspend indication with a release cause "other" or "RRC connection failure". The UE may initiate an UP EDT in a different cell where the UE was not moved to IDLE with a suspend indication in the preceding connection and fail to resume before receiving Msg4, the UE may move to IDLE without s suspend indication with s release cause "other" or "RRC connection failure". The UE may store only a single NCC but calculate the NH parameter immediately after receiving a new NCC different that currently stored in the RRCConnectionRelease message during the suspend procedure. The UE may store two NCCs (both old and new) and in case of a next legacy resume procedure, the UE may receive another new NCC in Msg4 and compare with the last used NCC (i.e., the said old NCC).

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for use in a user equipment (UE), the apparatus comprising:
   a memory to store a current security key (KeNB); and
   processing circuitry arranged to:
     select, based on a Next Hop Chaining Counter (NCC), one of an early data transmission (EDT) random access (RA) preamble or non-EDT RA preamble for transmission to a base station; and
     if the EDT-RA preamble is selected, and after transmission of the EDT RA preamble;
       decode a random access response (RAR) from the base station, the RAR comprising an uplink allocation for transmission of a radio resource control (RRC) message;
       in response to reception of the RAR, encode the RRC message for transmission to the base station using the uplink allocation; and
       if the uplink allocation includes a data allocation:
         derive a new security key ($K_{eNB}^*$) using the current security key and store the new security key in the memory, and
         encode, for transmission to the base station using the data allocation, uplink data encrypted using a key derived from the new security key.

2. The apparatus of claim wherein the processing circuitry is further arranged to:
   determine whether a received Next Hop Chaining Counter (NCC) received prior to selection of the EDT RA preamble is different than a current Next Hop Chaining Counter (NCC) stored in the memory, and
   if the received NCC is different from the current NCC, select the non-EDT RA preamble for transmission to the base station.

3. The apparatus of claim 1, wherein the processing circuitry is further arranged to:
   determine whether a received Next Hop Chaining Counter (NCC) received prior to selection of the EDT RA preamble is different than a current Next Hop Chaining Counter (NCC) stored in the memory,
   if the received NCC and current NCC are the same, select the EDT RA preamble for transmission to the base station and derive the new security key prior to transmission of the RRC message.

4. The apparatus of claim 3, wherein:
   the UE is in an RRC Idle state when the RAR response is received, and
   the processing circuitry is further arranged to:
     determine that the uplink allocation does not include the data allocation, and, in response fall back to a non-EDT RRC connection procedure in which the HE is configured to:
       enter an RRC Connected state, and
       avoid derivation of the new security key after reception, from the base station, of another RRC message in response to transmission of the RRC message.

5. The apparatus of claim 4, wherein:
   the other RRC message comprises an RRC NCC, and the processing circuitry is further arranged to ignore the RRC NCC in security key derivation.

6. The apparatus of claim 3, wherein
   the processing circuitry is further arranged to increase a coverage enhancement (CE) level in response to failure to receive the RAR after transmission of the EDT RA preamble and repeat transmission of the EDTS RA preamble after the increase of the CI level, the RAR is received after the increase of the CE level, and the processing circuitry is further arranged to:
after reception of the uplink allocation that includes the data allocation, determine whether the uplink allocation is insufficient to enable transmission of the uplink data due to the increase of the CE level, and
in response to a determination that the uplink allocation is insufficient to enable transmission of the uplink data due to the increase of the CE level, fall back to a non-EDT RRC connection procedure.

7. The apparatus of claim 6, wherein in the non-EDT RRC connection procedure, the processing circuitry is further arranged to:
encode, for transmission to the base station, the RRC message without the uplink data,
delete the new security key stored in the memory,
decode another RRC message, from the base station, in response to transmission of the RRC message without transmission of the uplink data, the other RRC message comprising an RCC NCC, and
derive another new security key using the RCC NCC and the current security key after reception of the other RRC message, for transmission of the uplink data.

8. The apparatus of claim 3, wherein the processing circuitry is further arranged to:
decode, from the base station in response to transmission of the RCC message, another RRC message, the other RRC message comprising a suspend indication, and
dependent on the other RRC message, one of
enter an RRC Idle state and delete the new security key from the memory, or
delete the current security key from the memory.

9. The apparatus of claim 3, wherein the processing circuitry is further arranged to:
delete the new security key in the memory in response to one of:
expiration of a timer T300 before reception of another RRC message from the base station, or
reselection of a cell during a RA procedure for EDT.

10. The apparatus of claim 2, wherein:
the received NCC was received during suspension of the RRC connection, and
the processing circuitry is further arranged to:
derive a security key for a non-EDT RRC connection procedure using the current NCC, and
derive a security key for an EDT RRC connection procedure using the received NCC.

11. The apparatus of claim 2, wherein:
the memory is configured to store the new NCC, and
the processing circuitry is further arranged to:
if the UE initiates an EDT RRC connection procedure, compare the current and received, NCC prior to transmission of the RA preamble to determine whether to use vertical or horizontal derivation to derive the new security key, and
if the UE initiates a non-EDT RRC connection procedure:
wait until another RRC message containing a newer NCC is received from the base station, and
compare the newer NCC with the current NCC to determine whether to use vertical or horizontal derivation to derive the new security key.

12. An apparatus for use in a base station, the apparatus comprising:
a memory to store a current Next Hop Chaining Counter (NCC);
processing circuitry arranged to:
decode, from a user equipment (UE), one of an early data transmission (EDT) random access (RA) preamble or a non-EDT RA preamble;
encode, for transmission to the UE, a random access response (RAR) in response to reception of the EDT RA preamble, the RAR comprising an uplink grant for transmission of a radio resource control (RRC) message from the UE to the base station;
encode, for transmission to the UE in response to reception of the RRC message, another RRC message containing one of:
a suspend indication,
a RRC NCC to be ignored by the UE, or
the current NCC;
determine if uplink data is encoded in resources allocated in the uplink grant, which contains resources for the uplink data; and
encode the RRC message containing the suspend indication if the uplink data is encoded.

13. The apparatus of claim 12, wherein the processing circuitry is further arranged to:
encode the RRC message containing the current NCC if the uplink data is not encoded.

14. The apparatus of claim 12, wherein the processing circuitry is further arranged to:
determine if the uplink grant does not contain resources for uplink data, and
encode the RRC message containing the RRC NCC in response to determining that the uplink grant does not contain resources for uplink data.

15. The apparatus of claim 12, wherein the processing circuitry is further arranged to:
in response to a determination that the uplink data is not present, determine that the uplink data is not present due to a change in coverage enhancement (CE) level of the UE, and
ignore the RRC NCC in security key derivation after a determination that the uplink data is not present due to a change in the CE level of the LE.

16. The apparatus of claim 12, wherein the processing circuitry is further arranged to:
decode, if uplink grant includes a data grant, uplink data encrypted using a key derived from a new security key ($K_{eNB}$*) derived using the current NCC and a security key ($K_{eNB}$).

17. A non-transitory computer-readable storage medium that stores instructions for execution by one or more processors of a user equipment (UE), the one or more processors to configure the UE to, when the instructions are executed:
transmit an early data transmission (EDT) random access (RA) preamble to a base station;
receive a random access response (RAR) from the base station in response to transmitting the EDT RA preamble, the RAR comprising an uplink grant for transmission of an RRC message;
in response to reception of the RAR:
encrypt uplink data using a security key and transmit, in addition to the RRC message, the encrypted uplink data to the base station if the uplink grant includes a data grant containing resources for transmission of the uplink data, and
if the uplink grant excludes the data grant, fall back to a non-EDT RRC connection procedure in which the uplink data is encrypted using a key derived from the security key without re-deriving the security key when the non-EDT RRC connection procedure is initiated.

18. The medium of claim 17, wherein the instructions, when executed, further configure the UE to, after the non-EDT RRC connection procedure is initiated:
receive another RRC message containing an RRC Next Hop Chaining Counter (NCC), and
ignore the RRC NCC in transmission of the uplink data.

19. The medium of claim 17, wherein the instructions, when executed, further configure the UE to:
increase a coverage enhancement (CE) level in response to failure to receive the RAR after transmission of the EDT RA preamble and repeat transmission of the EDTS RA preamble after the increase of the CE level until the RAR received,
after reception of the uplink allocation that includes the data allocation, determine whether the uplink allocation is insufficient to enable transmission of the uplink data due to the increase of the CE level, and
in response to a determination that the uplink allocation is insufficient to enable transmission of the uplink data due to the increase of the CE level, fall back to the non-EDT RRC connection procedure.

* * * * *